United States Patent
Liu et al.

(10) Patent No.: US 11,011,992 B2
(45) Date of Patent: May 18, 2021

(54) METHOD AND SYSTEM FOR REDUCING THE CIRCULATING CURRENT BETWEEN MULTIPLE NON-ISOLATED MODULES OPERATING IN PARALLEL

(71) Applicant: Delta Electronics (Shanghai) Co., Ltd., Shanghai (CN)

(72) Inventors: Hongguang Liu, Shanghai (CN); Xinmin Bai, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 43 days.

(21) Appl. No.: 16/724,395

(22) Filed: Dec. 23, 2019

(65) Prior Publication Data
US 2020/0235669 A1 Jul. 23, 2020

(30) Foreign Application Priority Data
Jan. 18, 2019 (CN) .......................... 201910047048.0

(51) Int. Cl.
*H02M 3/158* (2006.01)
(52) U.S. Cl.
CPC ................................ *H02M 3/1584* (2013.01)
(58) Field of Classification Search
CPC ...... H02M 3/145; H02M 3/155; H02M 3/156; H02M 2/157; H02M 3/158; H02M 3/1584
See application file for complete search history.

(56) References Cited

U.S. PATENT DOCUMENTS

| | | | |
|---|---|---|---|
| 2012/0013372 A1* | 1/2012 | Campbell | H03K 5/135 327/141 |
| 2012/0014147 A1* | 1/2012 | Radosevich | H02M 7/493 363/71 |

(Continued)

FOREIGN PATENT DOCUMENTS

| | | |
|---|---|---|
| CN | 101202453 A | 6/2008 |
| CN | 101527501 A | 9/2009 |

(Continued)

OTHER PUBLICATIONS

Li Zhang et al., "Second-Harmonic Current Reduction for Two-Stage Inverter With Boost-Derived Front-End Converter: Control Schemes and Design Considerations", IEEE Transactions on Power Electronics, vol. 33, No. 7, Jul. 2018.

*Primary Examiner* — Adolf D Berhane
(74) *Attorney, Agent, or Firm* — CKC & Partners Co., LLC

(57) ABSTRACT

The present disclosure discloses a method and system for reducing a circulating current between a plurality of non-isolated modules operating in parallel. The input terminals and the output terminals of the plurality of non-isolated modules are respectively connected in parallel, and each of the non-isolated modules comprises a first stage converter, a bus capacitor and a second stage converter, which are electrically connected in sequence. For each of the non-isolated modules, the method comprises: comparing a first signal reflecting the input power of the non-isolated module with a reference value to obtain a comparison result; and adjusting the voltage of the bus capacitor according to the comparison result, wherein the voltage of the bus capacitor is decreased when the first signal is greater than the reference value, and the voltage of the bus capacitor is increased when the first signal is less than the reference value.

25 Claims, 4 Drawing Sheets

(56) References Cited

U.S. PATENT DOCUMENTS

| | | | | |
|---|---|---|---|---|
| 2014/0016379 A1* | 1/2014 | Yamamoto | ............. | H02M 5/44 |
| | | | | 363/37 |
| 2015/0171726 A1* | 6/2015 | Singh Riar | ............ | H02M 1/12 |
| | | | | 363/65 |
| 2019/0288595 A1* | 9/2019 | Ali | ........................ | H02M 7/493 |
| 2020/0083715 A1* | 3/2020 | Yoscovich | ............. | H02J 3/381 |
| 2020/0235655 A1* | 7/2020 | Hayashi | ................... | H02J 9/06 |

FOREIGN PATENT DOCUMENTS

| | | |
|---|---|---|
| CN | 201839015 U | 5/2011 |
| CN | 102570884 A | 7/2012 |
| CN | 103001521 B | 10/2014 |
| CN | 104506037 A | 4/2015 |

* cited by examiner

US 11,011,992 B2

METHOD AND SYSTEM FOR REDUCING THE CIRCULATING CURRENT BETWEEN MULTIPLE NON-ISOLATED MODULES OPERATING IN PARALLEL

CROSS-REFERENCE TO RELATED APPLICATIONS

This non-provisional application claims priority under 35 U.S.C. § 119(a) on Patent Application No. 201910047048.0 filed in P.R. China on Jan. 18, 2019, the entire contents of which are hereby incorporated by reference.

Some references, if any, which may include patents, patent applications and various publications, may be cited and discussed in the description of this disclosure. The citation and/or discussion of such references, if any, is provided merely to clarify the description of the present disclosure and is not an admission that any such reference is "prior art" to the disclosure described herein. All references listed, cited and/or discussed in this specification are incorporated herein by reference in their entireties and to the same extent as if each reference was individually incorporated by reference.

TECHNICAL FIELD

The present disclosure relates to a method and system for reducing the circulating current between a plurality of non-isolated modules operating in parallel.

BACKGROUND

In switch mode power supplies domain, the non-isolated modules usually have higher efficiency and higher power density than the isolated modules. However, when the inputs and outputs of the modules are respectively connected in parallel, a circulating current may easily occur between the modules. As a result, the input current of some modules may be too large to trigger current limiting, such that the total output power of the system cannot reach the rated value. In severe cases, some modules may be damaged due to the excessive input current.

Accordingly, there is an urgent need for a method and system that can efficiently reduce or eliminate the circulating current between a plurality of non-isolated modules operating in parallel.

SUMMARY

The present disclosure provides a method and a system for reducing the circulating current between a plurality of non-isolated modules operating in parallel.

In one or more embodiments of the present disclosure, a method for reducing the circulating current between a plurality of non-isolated modules operating in parallel is provided, wherein the input terminals and the output terminals of the plurality of non-isolated modules are connected in parallel, respectively, each of the non-isolated modules includes a first stage converter, a bus capacitor and a second stage converter, which are electrically connected in sequence, and for each of the non-isolated modules, the method comprises: comparing a first signal reflecting the input power of the non-isolated module with a reference value to obtain a comparison result; and adjusting the voltage of the bus capacitor of the non-isolated module according to the comparison result, wherein the voltage of the bus capacitor is decreased when the first signal is greater than the reference value, and the voltage of the bus capacitor is increased when the first signal is less than the reference value.

A system for reducing the circulating current between a plurality of non-isolated modules operating in parallel is further provide, wherein the input terminals and output terminals of the plurality of non-isolated modules are respectively connected in parallel, each of the non-isolated modules includes a first stage converter, a bus capacitor and a second stage converter, which are electrically connected in sequence, and the system comprises: a comparing unit configured to compare a first signal reflecting an input power of the non-isolated module with a reference value to obtain a comparison result; and a controlling unit connected to the comparing unit and configured to adjust the voltage of the bus capacitor according to the comparison result, wherein the voltage of the bus capacitor is decreased when the first signal is greater than the reference value, and the voltage of the bus capacitor is increased when the first signal is less than the reference value.

Hereinafter, the above description will be explained in detail with reference to embodiments, and a further explanation of the technical solution of the present disclosure will be provided.

DETAILED DESCRIPTION

Figure 1:
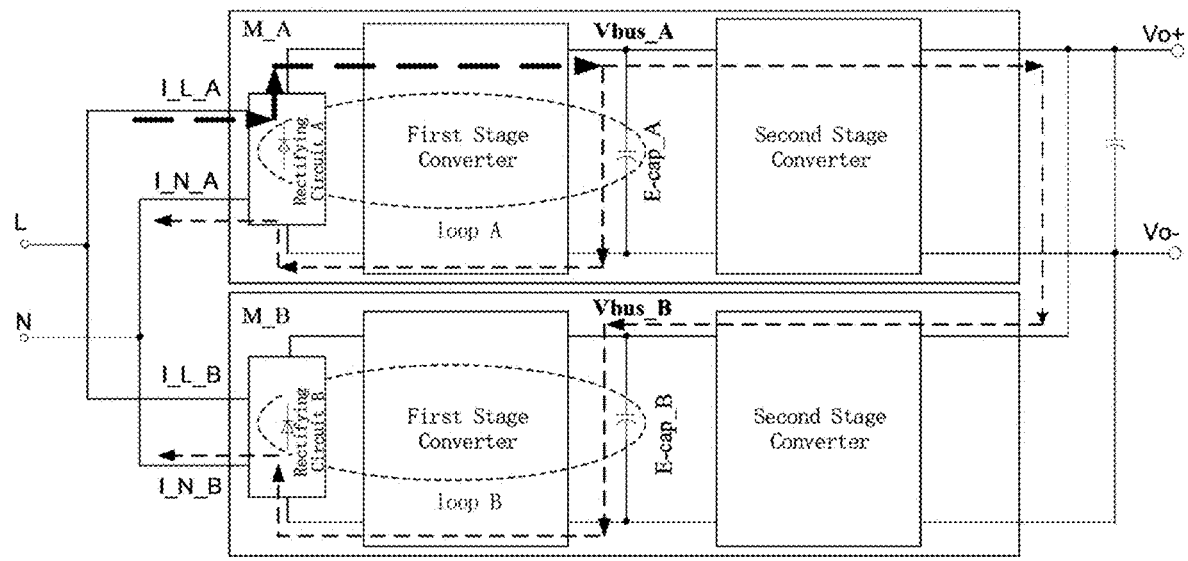
FIG. 1 is a schematic diagram of a circuit structure of non-isolated modules having two-stage architecture for a single-phase input, in which a circulating current may be generated between the loop A and the loop B when a control method known to the inventors is used.

Reference will be made to the accompanying drawings and the various embodiments to make the explanation of the present disclosure elaborate and complete, and the same numerals in the drawings may represent the same or similar components. On the other hand, well-known components and steps are not described in the embodiments to avoid any unnecessary limitation of the present disclosure. In addition, some of the conventional structures and elements will be shown in simplified illustration for the sake of simplicity of the drawings.

Furthermore, when an element is "connected", "coupled" or "provided" to other element, this element may be directly connected, directly coupled or directly provided to the other element, or this element may be indirectly connected, indirectly coupled or indirectly provided to the other element with another element(s) interposed between this element and the other element. Only in a case that an element is "directly connected", "directly coupled" or "directly provided" to other element, it means that there is not any element interposed between this element and the other element. The terms "first", "second", "third" and the like are only used to describe different elements and are not intended to limit the elements themselves. Therefore, a first element may also be called as a second element.

As shown in FIG. 1, both of the non-isolated modules M_A and M_B have the two-stage architecture. That is, each module includes a first stage converter, a bus capacitor and a second stage converter, which are electrically connected in sequence. When operating, the input terminals of the two modules M_A and M_B are connected in parallel and the output terminals of the two modules M_A and M_B are connected in parallel.

However, the bus voltages following the first stage converters of the two modules M_A and M_B (i.e., the voltages across the bus capacitors E-cap_A and E-cap_B) may be different due to the differences in devices and the errors in sampling. For example, if the bus voltage Vbus_A of loop A in the module M_A is greater than the bus voltage Vbus_B of loop B in the module M_B, the loop A may provide power to the loop B, such that a circulating current may be generated between the two loops. As shown in FIG. 1, when line L for single-phase input is in the positive half cycle, the input current I_L_A of the loop A supplies power not only to the loop A (i.e., flowing into the bus capacitor E-cap_A) but also to the loop B (i.e., charging the bus capacitor E-cap_B via the second stage converter), and finally flows back from line N as currents I_N_A and I_N_B. As such, the input current I_L_A flowing into the loop A may be greater than the input current I_L_B flowing into the loop B. When the circulating current is significant, the input current I_L_B may be equal to 0, such that all of the output power is provided by the loop A. In such a case, the total output power of the system is provided by the module M_A. Therefore, the total output power is greatly reduced due to the occurrence of the circulating current, and the module M_A may be damaged by overheating when operating for long time.

The method and system for reducing the circulating current between a plurality of non-isolated modules operating in parallel according to the present disclosure will be described in detail with reference to FIGS. 2-6.

Figure 2:
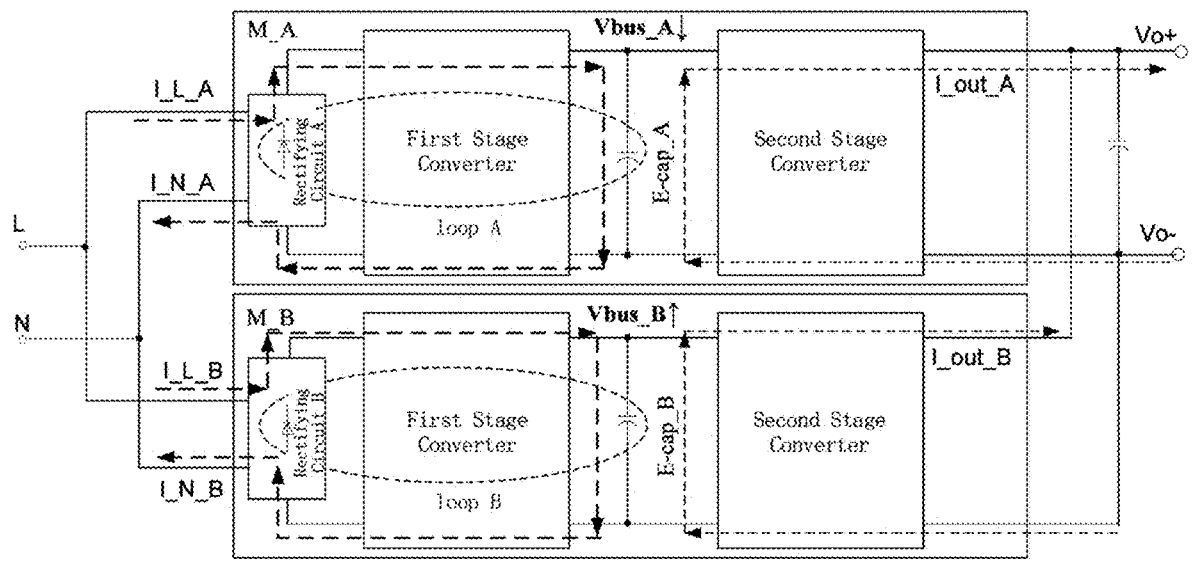
FIG. 2 is a schematic diagram of a circuit structure of non-isolated modules having two-stage architecture for a single-phase input to which the method of the present disclosure is applied.

FIG. 2 illustrates a circuit structure of non-isolated modules having two-stage architecture for a single-phase input to which the method of the present disclosure is applied. The non-isolated modules may operate in parallel, that is, the input terminals and the output terminals of the plurality of non-isolated modules are respectively connected in parallel. FIG. 2 illustrates two non-isolated modules M_A and M_B operating in parallel, and the input terminals of the two non-isolated modules M_A and M_B are respectively coupled to a single-phase power supply side which comprises a terminal line L and a terminal line N, while the output terminals are respectively coupled to a load side which comprises a terminal Vo+ and a terminal Vo−. Moreover, each of the non-isolated modules includes a first stage converter, a bus capacitor (such as E-cap_A and E-cap_B) and a second stage converter which are electrically connected in sequence. Although only two non-isolated modules operating in parallel are shown in FIG. 2, it can be understood that the number of the non-isolated modules may be more than two in other embodiments, and the present disclosure is not limited thereto.

Figure 3:
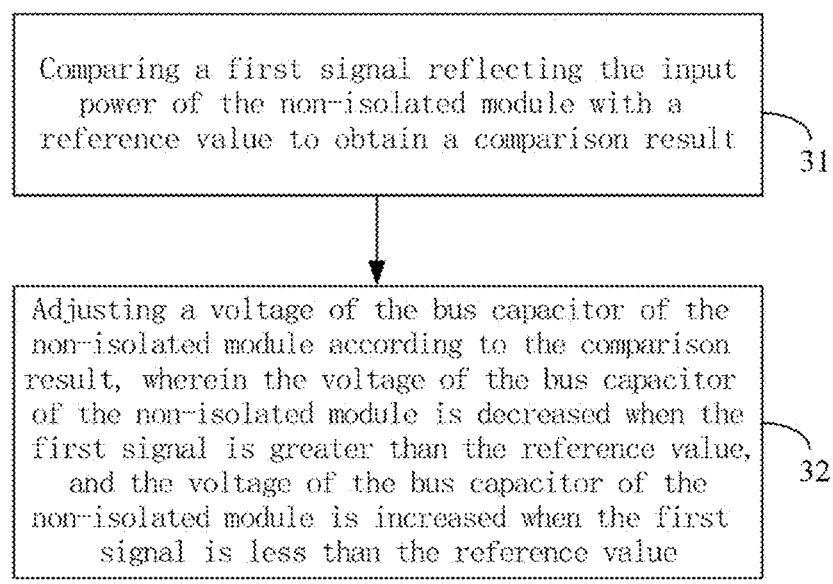
FIG. 3 is a schematic diagram of a method for reducing the circulating current of a plurality of non-isolated modules operating in parallel in accordance with the present disclosure.

As shown in FIG. 3, for each of the non-isolated modules, such as the non-isolated modules M_A and M_B in FIG. 2, the method for reducing the circulating current of a plurality of non-isolated modules operating in parallel according to the present disclosure may comprises: step 31 of comparing a first signal reflecting the input power of the non-isolated module with a reference value to obtain a comparison result; and step 32 of adjusting a voltage of the bus capacitor of the non-isolated module according to the comparison result, wherein the voltage of the bus capacitor is decreased when the first signal is greater than the reference value, and the voltage of the bus capacitor is increased when the first signal is less than the reference value. In some embodiments, a first difference value may be obtained by subtraction between the first signal and the reference signal (i.e., subtracting the reference signal from the first signal), the voltage of the bus capacitor may be decreased when the first difference value is greater than zero, and the voltage of the bus capacitor may be increased when the first difference value is less than zero. In another preferred embodiment, a second difference value may be obtained by subtracting the first signal from the reference value, the voltage of the bus capacitor may be increased when the second difference value is greater than zero (i.e., the first signal is less than the reference value), and the voltage of the bus capacitor may be decreased when the second difference value is less than zero (i.e., the first signal is greater than the reference value). In other embodiments, the comparison result may be obtained by other comparison method, which is not intended to limit the disclosure.

In some embodiments of the present disclosure, the input current and the input voltage of the first stage converter of the non-isolated module may be sampled, and the first signal may be calculated according to the sampled values of the input current and the input voltage, in step 31. In such a case, the reference value reflects an average value of the output power of the plurality of non-isolated modules or an average value of the input power of the plurality of non-isolated modules. For example, the average value of the output power or the input power may be directly used as the reference value, or a proportional value of the output power or the input power may be used as the reference value, which is not intended to limit the present disclosure.

In some embodiments of the present disclosure, the input current of the non-isolated module may be sampled, and the first signal may be calculated according to the sampled value of the input current, in step 31. In such a case, the reference value reflects an average value of the input current of the plurality of non-isolated modules. For example, an average value of the input current may be directly used as the reference value, or a proportional value of the input current may be used as the reference value, which is not intended to limit the present disclosure.

In other embodiments of the present disclosure, the output current of the first stage converter and the capacitor voltage of the bus capacitor in the non-isolated module may be sampled, and the first signal may be calculated according to the sampled values of the output current and the capacitor voltage, in step 31. In such a case, the reference value reflects an average value of the output power of the first stage converters. For example, an average value of the output power may be directly used as the reference value, or a proportional value of the output power may be used as the reference value, which is not intended to limit the present disclosure.

The present disclosure may preferably apply multiple sampling methods described above to detect the first signals reflecting the input power of the non-isolated modules M_A and M_B, respectively, and compare the first signals with a reference value to obtain the corresponding comparison results, such as the first difference values, and adjust the voltages of the bus capacitors E-cap_A and E-cap_B in the respective non-isolated modules M_A and M_B according to the first difference values, such that the circulating current can be reduced or eliminated. For example, when circulating current occurs between the two non-isolated modules M_A and M_B because the voltage Vbus_A of the bus capacitor E-cap_A is higher than the voltage Vbus_B of the bus capacitor E-cap_B (for example, as shown in FIG. 1), the voltage Vbus_A of the non-isolated module M_A with larger input power can be adjusted to a lower level, and the voltage Vbus_B of the non-isolated module M_B with smaller input power can be adjusted to a higher level, such that the first stage converter of each of the non-isolated modules M_A and M_B can supply power only to its own subsequent stage. As shown in FIG. 2, the input current I_L_A of the loop A can only supply power to the loop A by flowing into the bus capacitor E-cap_A and the second stage converter of the non-isolated module M_A, i.e., as the output current I_out_A, and flowing back to the line N as the current I_N_A. The input current I_L_B of the loop B can only supply power to the loop B by flowing into the bus capacitor E-cap_B and the second stage converter of the non-isolated module M_B, i.e., as the output current I_out_B, and flowing back to the line N as the current I_N_B. Thus, the circulating current between the non-isolated modules M_A and M_B connected in parallel can be effectively reduced or eliminated by applying the method of the present disclosure. Conversely, when the voltage Vbus_A of the bus capacitor E-cap_A is lower than the voltage Vbus_B of the bus capacitor E-cap_B, the voltage Vbus_A can be adjusted to a higher level and the voltage Vbus_B can be adjusted to a lower level to reduce or eliminate the circulating current between the non-isolated modules M_A and M_B connected in parallel.

Figure 4:
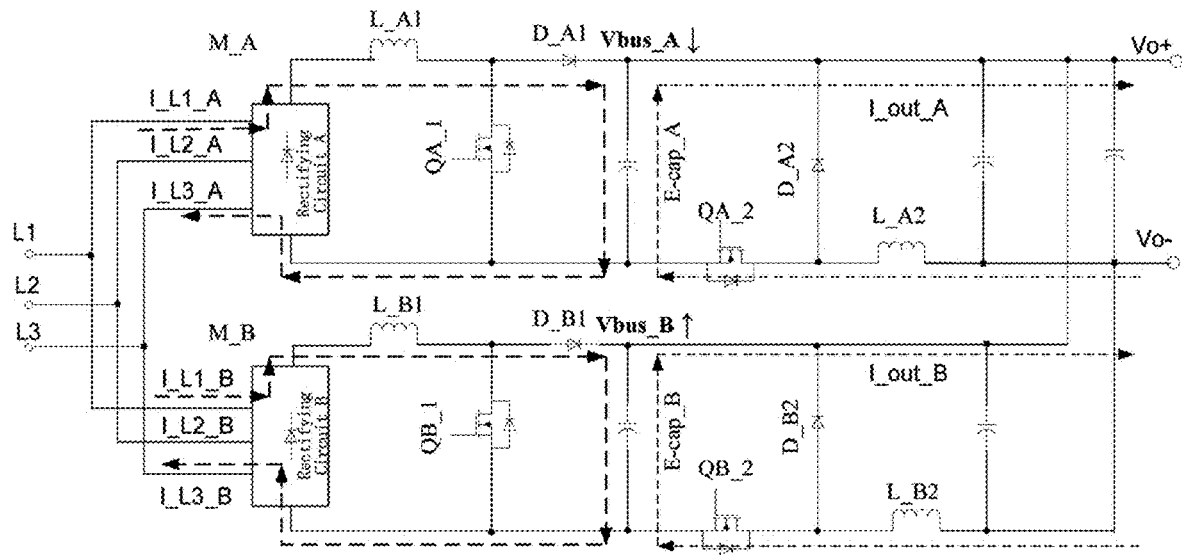
FIG. 4 is a schematic diagram of a circuit structure of non-isolated modules having two-stage architecture for a three-phase input to which the method of the present disclosure is applied.

The method for reducing the circulating current of non-isolated modules according to the present disclosure may also be applied to non-isolated modules having a circuit structure of two-stage architecture for three-phase input. FIG. 4 shows a specific embodiment for three-phase input, in which the input terminals of two non-isolated modules M_A and M_B are respectively coupled to the three-phase power supply side, i.e., the terminal line L1, the terminal line L2 and the terminal line L3, and the output terminals of the two non-isolated modules M_A and M_B are coupled to the load side which comprises terminals Vo+ and Vo−. Further, in the embodiment shown in FIG. 4, at least a portion of the respective first stage converters and the respective bus capacitors E-cap_A, E-cap_B of the non-isolated modules M_A, M_B constitute boost circuits, respectively, in which the respective bus capacitors E-cap_A, E-cap_B are connected in parallel to the output terminals of the respective first stage converters, and each of the respective first stage converters comprises a first inductor, a first diode and a first power switch. The respective second stage converters of the non-isolated modules M_A, M_B may comprise buck circuits each having an input terminal connected in series to the output terminal of the respective first stage converter, and the buck circuit may comprise a second inductor, a second power switch and a second diode.

In some embodiments of the present disclosure, in the buck circuit, the second inductor is connected between the anode of the second diode and the negative output terminal of the buck circuit, and the second power switch is connected between the negative input terminal of the buck circuit and the anode of the second diode.

For example, as shown in FIG. 4, the boost circuit in the loop A comprises an inductor L_A1, a switch QA_1, a diode D_A1 and the bus capacitor E-cap_A, and the buck circuit in the loop A comprises a switch QA_2, an inductor L_A2 and a diode D_A2. The boost circuit in the loop B comprises an inductor L_B1, a switch QB_1, a diode D_B1 and the bus capacitor E-cap_B, and the buck circuit in the loop B comprises a switch QB_2, an inductor L_B2 and a diode D_B2. One terminal of the switch QA_2 is connected to the negative output terminal of the first stage converter in the non-isolated module M_A, and the other terminal of the switch QA_2 is connected to the anode of the diode D_A2 and one terminal of the inductor L_A2, then the cathode of diode D_A2 is connected to the positive output terminal of the corresponding first stage converter and the positive output terminal of the buck circuit, the other terminal of the inductor L_A2 is connected to the negative output terminal of the buck circuit. The buck circuit of the non-isolated module M_B is configured to have the same structure, such that the current from the negative output terminal of the buck circuit to the negative output terminal of the first stage converter is controllable in both the non-isolated modules M_A and M_B.

When the voltage of the line L1 is the highest and the voltage of the line L3 is the lowest, the bus voltage Vbus_A (i.e., the voltage on the bus capacitor E-cap_A) in the loop A is higher than the bus voltage Vbus_B (i.e., the voltage on the bus capacitor E-cap_B) in the loop B, such that the input power of the loop A may be greater than the input power of the loop B. At this point, the bus voltage Vbus_A of the loop A can be decreased (i.e., adjusted to a lower level), and the bus voltage Vbus_B of the loop B can be increased (i.e., adjusted to a higher level), such that the first stage converters in the loops A and B can only supply power to their own subsequent stages. As shown in FIG. 4, the input current I_L1_A of the loop A can only supply power to the loop A by flowing into the bus capacitor E-cap_A and the second stage converter of the non-isolated module M_A as the output current I_out_A, and flowing back to the line L3 as the current I_L3_A which is equal and opposite to the current I_L_1_A. The input current I_L1_B of the loop B can only supply power to the loop B by flowing into the bus capacitor E-cap_B and the second stage converter of the non-isolated module M_B as the output current I_out_B, and flowing back to the line L3 as the current I_L3_B which is equal and opposite to the current I_L1_B. Therefore, the circulating current between the non-isolated modules M_A and M_B connected in parallel can be effectively reduced or eliminated by using the method of the present disclosure.

According to the embodiment of the present disclosure, the first stage converter comprising a first power switch, when adjusting the voltage of the bus capacitor according to the comparison result, is further configured to adjust an on-time of the first power switch according to the first difference value obtained by subtraction between the first signal and the reference value. For example, the first difference value may be superimposed with a given voltage value to obtain an adjusted voltage; a capacitor voltage of the bus capacitor of the non-isolated module may be sampled; and the sampled value of the capacitor voltage may be compared with the adjusted voltage to control the on-time of the first power switch. Herein, the given voltage value reflects a desired voltage value of the bus capacitor. In one embodiment of the present disclosure, dual-loop control may be applied to the first stage converter, that is, the outer loop is a voltage closed loop and the inner loop is a current closed loop, and the adjusted voltage may serve as a reference value for the voltage closed loop.

In some embodiments, each of the non-isolated modules may further comprise a rectifying circuit when the input terminals are coupled to AC (i.e., an AC source, an AC output of inverter, an AC mains supply and so on). As shown in FIG. 2, the non-isolated module M_A may comprise a rectifying circuit A, the non-isolated module M_B may comprise a rectifying circuit B, the input terminals of the rectifying circuits A and B are connected in series to the input terminals of the non-isolated modules M_A and M_B, respectively, and the output terminals of the rectifying circuits A and B are connected in series to the input terminals of the first stage converters, respectively. The rectifying circuits A and B may be, for example, full-bridge circuits composed of diodes, but the present disclosure is not limited thereto.

As shown in FIG. 4, In some embodiments, a rectifying circuit may be integrated into the corresponding first stage converter when the input terminals of the non-isolated modules are both coupled to AC (i.e., an AC source, an AC output of inverter, an AC mains supply and so on). The first stage converter of the non-isolated module M_A may comprise a rectifying circuit A, the first stage converter of the non-isolated module M_B may comprise a rectifying circuit B, and the input terminals of the rectifying circuits A and B are connected in series to the input terminals of the non-isolated modules M_A and M_B, respectively.

Figure 5:
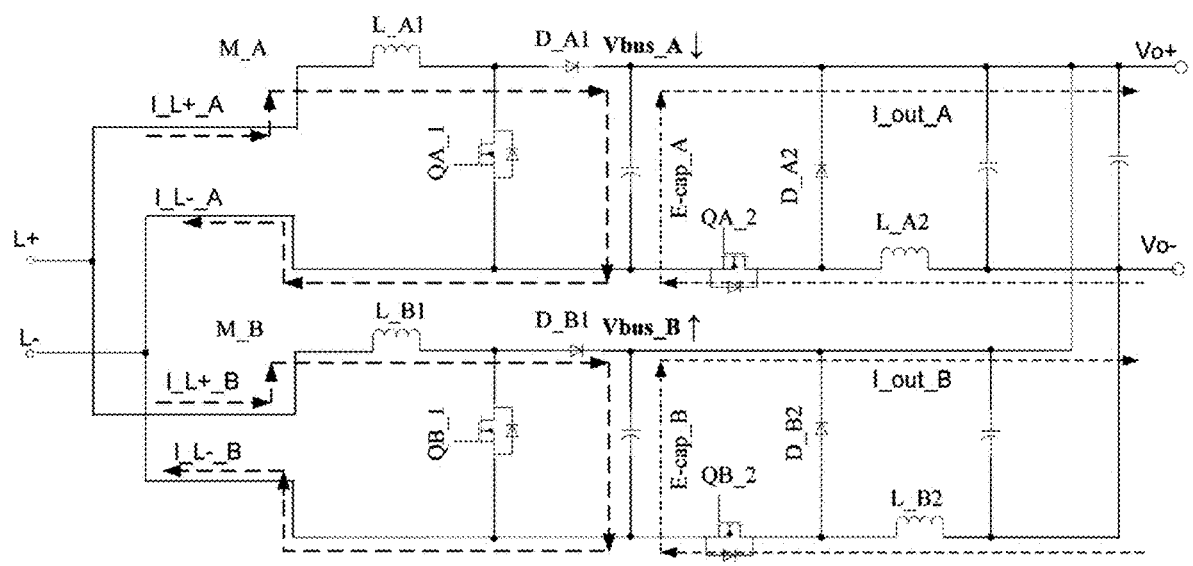
FIG. 5 is a schematic diagram of a circuit structure of non-isolated modules having two-stage architecture for a direct-current input to which the method of the present disclosure is applied.

The method for reducing the circulating current between the non-isolated modules according to the present disclosure may also be applied to non-isolated modules for direct current input. FIG. 5 shows a circuit structure of non-isolated modules having two-stage architecture for a direct-current input to which the method of the present disclosure is applied. Different from the embodiments as shown in FIG. 2 and FIG. 4, the input terminals of the two non-isolated modules M_A and M_B in FIG. 5 are coupled to the direct current inputs L+ and L−, respectively, such that the rectifying circuit can be omitted. As shown in FIG. 5, when the first stage converters in the loops A and B only supply power to their own subsequent stages, the input current I_L+_A of the loop A can only supply power to the loop A by flowing into the bus capacitor E-cap_A and the second stage converter of the non-isolated module M_A as the output current I_out_A, and flowing back to the line L− as the current I_L−_A which is equal and opposite to the input current I_L+_A. The input current I_L+_B of the loop B can only supply power to the loop B by flowing into the bus capacitor E-cap_B and the second stage converter of the non-isolated module M_B as the output current I_out_B, and flowing back to the line L− as the current I_L−_B which is equal and opposite to the input current I_L+_B. Therefore, the circulating current between the non-isolated modules M_A and M_B connected in parallel can be effectively reduced or eliminated by using the method of the present disclosure.

While FIG. 2, FIG. 4 and FIG. 5 each shows the embodiment having two loops connected in parallel (i.e., two non-isolated modules operating in parallel), it can be understood that the embodiment can be extended to have two or more loops connected in parallel, which is not intended to limit the present disclosure. Moreover, in the present disclosure, the first stage converter and the second stage converter in each of the non-isolated modules are not limited to the circuits in the above embodiments, and they can have circuit structures different from those in the above embodiments, which is not intended to limit the present disclosure.

Also, in other embodiments of the disclosure, the plurality of non-isolated modules may operate in an interleaving manner. The so-called "interleaving" means that, when the loops connected in parallel are operating, the on-times of the switches in respective loops may interleave with each other by a certain phase, such that both of the current ripple and voltage ripple in the parallel connection may be reduced due to partial offset.

Corresponding to the method for reducing the circulating current between the non-isolated modules according to the present disclosure, the present disclosure provides a system for reducing the circulating current between a plurality of non-isolated modules operating in parallel, wherein the input terminals and the output terminals of the plurality of non-isolated modules are respectively connected in parallel, each of the non-isolated modules includes a first stage converter, a bus capacitor and a second stage converter, which are electrically connected in sequence. Correspondingly, the system comprises a comparing unit and a controlling unit. The comparing unit is configured to compare a first signal reflecting the input power of the non-isolated module with a reference value to obtain a comparison result. The controlling unit is connected to the comparing unit and configured to adjust the voltage of the bus capacitor according to the comparison result, wherein the voltage of the bus capacitor is decreased when the first signal is greater than the reference value, and the voltage of the bus capacitor is increased when the first signal is less than the reference value.

In the present disclosure, the system may further comprise a sampling unit having an input side connected to the non-isolated module and an output side connected to the comparing unit. The comparing unit receives a sampled signal output from the sampling unit, calculates the first signal reflecting the input power of the non-isolated module according to the sampled signal, and compares the first signal with the reference value to obtain the comparison result. The comparison result is output to the controlling unit, such that the controlling unit may adjust the voltage of the bus capacitor according to the comparison result.

In the present disclosure, the system may further comprise a reference value computing unit connected to the sampling unit and the comparing unit, and configured to calculate the reference value and output the reference value to the comparing unit. Preferably, the sampling unit, the comparing unit and the controlling unit may be contained in each of the non-isolated modules, i.e., integrated in each of the non-isolated modules, and for example, the reference value computing unit is connected to the sampling unit and the comparing unit in each of the non-isolated modules, respectively. Certainly, in other embodiments, the sampling unit, the comparing unit and the controlling unit may be separate components, which are not intended to limit the present disclosure.

Figure 6:
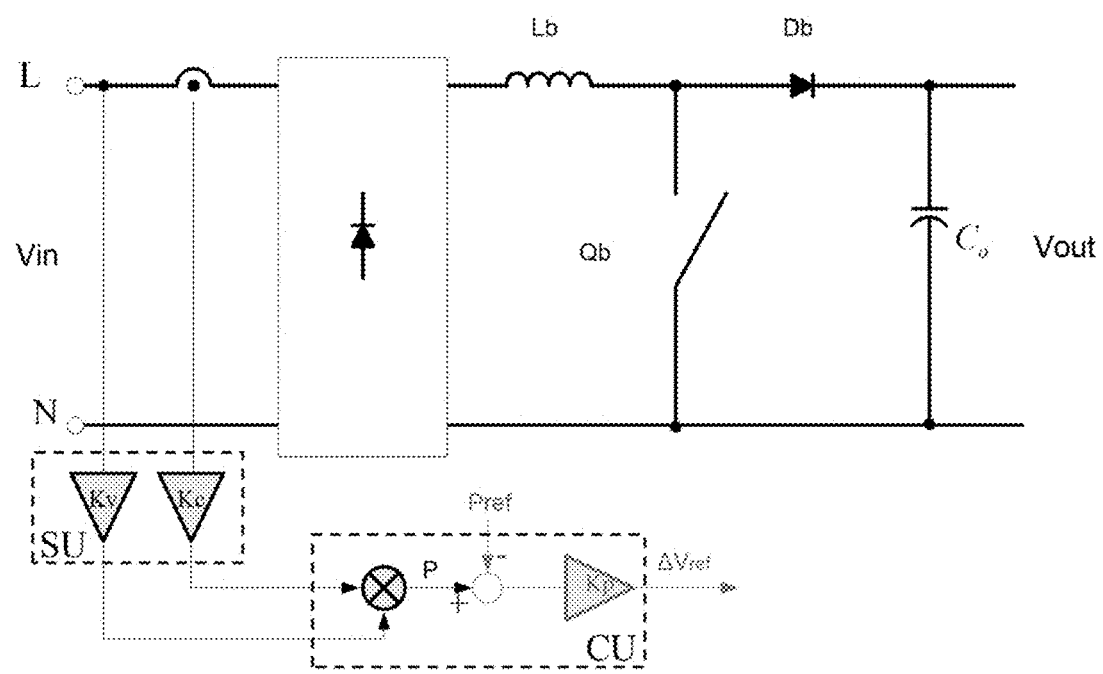
FIG. 6 is a schematic diagram showing a preferred circuit structure performing sampling and controlling operations by using the system for reducing the circulating current between a plurality of non-isolated modules operating in parallel in accordance with the present disclosure.

In some embodiments of the present disclosure, the input side of the sampling unit may be coupled to the input terminal of the non-isolated module; wherein the sampled signal comprises the sampled values of the input current and input voltage of the non-isolated module, and the reference value reflects an average value of the output power of multiple non-isolated modules or an average value of the input power of multiple non-isolated modules. For example, FIG. 6 shows a preferred circuit structure performing sampling and controlling operations by using the system of the present disclosure, wherein the sampling unit SU may sample the sampled signals of the non-isolated module, such as input voltage and input current, and the sampled signals are input to the comparing unit CU which may calculate a first signal, such as input power P, according to the sampled values of the input current and the input voltage by using a multiplier. The comparing unit CU may also obtain a comparison result (such as, a difference value) by comparing the input power P with a reference value Pref using a comparator, wherein the reference value Pref is an average value of the input power of the plurality of non-isolated modules. The comparing unit CU may also convert the comparison result into a voltage difference ΔVref by using a proportional regulator Kp, and the voltage difference ΔVref can be output to the controlling unit (not shown) such that the controlling unit may adjust the voltage of the bus capacitor of the non-isolated module according to the voltage difference ΔVref.

In some embodiments, the sampling unit SU, the comparing unit CU and the controlling unit (not shown) may each be a separate component. However, in other embodiments, the sampling unit SU, the comparing unit CU and the controlling unit may be integrated into each of the non-isolated modules. For example, each of the non-isolated modules may directly utilize the input voltage, the input current, the voltage of the bus capacitor or other signals obtained from other existing hardware circuits as the sampled signals (certainly, it can be understood that the sampled signals can also be obtained by a newly added sampling circuit, not only the existing hardware circuit), and the sampled signals can be communicated to a system controlling unit of the non-isolated module via a communication unit. The system controlling unit calculates the first signal and the reference value, such as input power and average input power (i.e., the average of multiple input power), according to the sampled signals (i.e., the system controlling unit performs the function of the reference value computing unit), compares the input power of each non-isolated module with the average input power (or compares the input power with the average output power/efficiency), and adjusts the voltage of the corresponding bus capacitor to a higher level or a lower level according to the comparison result, which are not intended to limit the present disclosure.

In another embodiment of the present disclosure, the input side of the sampling unit may be connected to the input terminal of each non-isolated module, wherein the sampled signals may comprise the sampled value of the input current of each non-isolated module, and the reference value may reflect an average value of the input current of multiple non-isolated modules.

In a further embodiment of the present disclosure, the input side of the sampling unit may be connected to the output terminal of the first stage converter of each non-isolated module, wherein the sampled signal may comprise the sampled values of the output current of the first stage converter and the capacitor voltage of the corresponding bus capacitor, and the reference value may reflect an average value of the output power of the first stage converters.

In one or more embodiments of the present disclosure, the first stage converter of the non-isolated module comprises a first power switch, and the comparing unit performs a subtraction between the first signal and the reference value to obtain a difference value, wherein the controlling unit, when adjusting the voltage of the bus capacitor according to the comparison result, may be further configured to adjust an on-time of the first power switch according to the difference value. For example, the controlling unit may superimpose the difference value with a given voltage value to obtain an adjusted voltage, obtain a sampled value of the capacitor voltage of the bus capacitor, and compare the sampled value with the adjusted voltage to control the on-time of the first power switch.

Similarly, in the system of the present disclosure, at least a portion of the first stage converter and the bus capacitor in each non-isolated module may constitute a boost circuit in which the bus capacitor is connected in parallel to the output terminal of the first stage converter, and the first stage converter may comprise a first inductor, a first diode, and the first power switch.

Similarly, in the system of the present disclosure, the second stage converter in each non-isolated module may comprise a buck circuit having an input terminal connected in series to the output terminal of the first stage converter, and the buck circuit may comprise a second inductor, a second power switch and a second diode.

Similarly, in the system of the present disclosure, in each of the buck circuits, the second inductor is connected between the anode of the second diode and the negative output terminal of the buck circuit, and the second power switch is connected between the negative input terminal of the buck circuit and the anode of the second diode.

Similarly, in the system of the present disclosure, each of the first stage converter of the non-isolated modules may further comprise a rectifying circuit having an input terminal connected in series to an input terminal of the non-isolated module, when the input of the non-isolated modules are AC (i.e., an AC source, an AC output of inverter, an AC mains supply).

Similarly, in the system of the present disclosure, the plurality of non-isolated modules may operate in an interleaving manner.

Similarly, in the system of the present disclosure, the input terminal of the first stage converter may be directly connected to the input terminal of the non-isolated module.

It can be understood that, the method and system for reducing a circulating current between a plurality of non-isolated modules operating in parallel according to the present disclosure, may efficiently reduce or eliminate the circulating current, by detecting a first signal that reflects the input power of the module, comparing the first signal with a reference value to obtain a comparison result, and adjusting the voltage of the bus capacitor according to the corresponding comparison result. The method and system of the present disclosure can be applied to digital power control, but is not limited thereto.

While the present disclosure has been disclosed in the above embodiments, the embodiments are not intended to limit the present disclosure, and various changes and modifications may be made to the present disclosure by any person skilled in the art without departing from the spirit and scope of the present disclosure, so the protection scope of the present disclosure is defined by the appended claims.

What is claimed is:

1. A method for reducing a circulating current between a plurality of non-isolated modules operating in parallel, the plurality of non-isolated modules having input terminals and output terminals respectively connected in parallel, each of the non-isolated modules comprising a first stage converter, a bus capacitor and a second stage converter, which are electrically connected in sequence, for each of the non-isolated modules, the method comprising:

comparing a first signal reflecting an input power of the non-isolated module with a reference value to obtain a comparison result; and adjusting a voltage of the bus capacitor according to the comparison result, wherein the voltage of the bus capacitor is decreased when the first signal is greater than the reference value, and the voltage of the bus capacitor is increased when the first signal is less than the reference value.

2. The method of claim 1, further comprising:
sampling an input current and an input voltage of the non-isolated module, and calculating the first signal according to the sampled values,
wherein the reference value reflects an average value of output power of the plurality of non-isolated modules or an average value of the input power of the plurality of non-isolated modules.

3. The method of claim 1, further comprising:
sampling an input current of the non-isolated module, and calculating the first signal according to the sampled value,
wherein the reference value reflects an average value of the input current of the plurality of non-isolated modules.

4. The method of claim 1, further comprising:
sampling an output current of the first stage converter and a capacitor voltage of the bus capacitor in the non-isolated module, and calculating the first signal according to the sampled values,
wherein the reference value reflects an average value of output power of the first stage converters of the plurality of non-isolated modules.

5. The method of claim 2, wherein the first stage converter of the non-isolated module comprises a first power switch, and the step of adjusting the voltage of the bus capacitor according to the comparison result comprises:
adjusting an on-time of the first power switch according to a difference value obtained by subtraction between the first signal and the reference value.

6. The method of claim 5, wherein the step of adjusting the on-time of the first power switch according to the difference value comprises:
superimposing the difference value with a given voltage value to obtain an adjusted voltage;
sampling the capacitor voltage of the bus capacitor; and
comparing the sampled value of the capacitor voltage with the adjusted voltage to control the on-time of the first power switch.

7. The method of claim 1, wherein the plurality of non-isolated modules operate in an interleaving manner.

8. The method of claim 1, wherein the second stage converter in each of the non-isolated modules comprises a buck circuit having an input terminal connected in series to an output terminal of the first stage converter, and the buck circuit comprises a second inductor, a second power switch and a second diode, wherein the second inductor is connected between an anode of the second diode and a negative output terminal of the buck circuit, and the second power switch is connected between a negative input terminal of the buck circuit and the anode of the second diode.

9. The method of claim 8, wherein the first stage converter comprises a rectifying circuit having an input terminal connected in series to the input terminal of the non-isolated module, wherein the input of the non-isolated modules are AC.

10. A system for reducing a circulating current between a plurality of non-isolated modules operating in parallel, the plurality of non-isolated modules having input terminals and output terminals respectively connected in parallel, each of the non-isolated modules comprising a first stage converter, a bus capacitor and a second stage converter, which are electrically connected in sequence, the system comprising:
a comparing unit configured to compare a first signal reflecting an input power of the non-isolated module with a reference value to obtain a comparison result; and
a controlling unit connected to the comparing unit and configured to adjust a voltage of the bus capacitor according to the comparison result, wherein the controlling unit decreases the voltage of the bus capacitor when the first signal is greater than the reference value, and increases the voltage of the bus capacitor when the first signal is less than the reference value.

11. The system of claim 10, further comprising:
a sampling unit configured to sample an input current and an input voltage of the non-isolated module,
wherein the comparing unit is connected to the sampling unit, and configured to calculate the first signal according to the sampled values and compare the first signal with the reference value to obtain the comparison result, and
wherein the reference value reflects an average value of output power of the plurality of non-isolated modules or an average value of the input power of the plurality of non-isolated modules.

12. The system of claim 10, further comprising:
a sampling unit configured to sample an input current of the non-isolated module,
wherein the comparing unit is connected to the sampling unit, and configured to calculate the first signal according to the sampled value and compare the first signal with the reference value to obtain the comparison result, and
wherein the reference value reflects an average value of the input current of the plurality of non-isolated modules.

13. The system of claim 10, further comprising:
a sampling unit configured to sample an output current of the first stage converter and a capacitor voltage of the bus capacitor in the non-isolated module,
wherein the comparing unit is connected to the sampling unit, and configured to calculate the first signal according to the sampled values and compare the first signal with the reference value to obtain the comparison result, and
wherein the reference value reflects an average value of output power of the first stage converters of the plurality of non-isolated modules.

14. The system of claim 11, wherein the first stage converter of the non-isolated module comprises a first power switch, wherein the comparing unit is configured to obtain a difference value by subtraction between the first signal and the reference value, and wherein, when adjusting the voltage of the bus capacitor according to the comparison result, the controlling unit is further configured to:
adjust an on-time of the first power switch according to the difference value.

15. The system of claim 14, wherein, when adjusting the on-time of the first power switch according to the difference value, the controlling unit is further configured to:
superimpose the difference value with a given voltage value to obtain an adjusted voltage;
obtain a sampled value of the capacitor voltage of the bus capacitor; and compare the sampled value of the capacitor voltage with the adjusted voltage to control the on-time of the first power switch.

16. The system of claim 15, wherein at least a portion of the first stage converter and the bus capacitor in each of the non-isolated modules constitute a boost circuit, in which the bus capacitor is connected in parallel to the output terminal of the first stage converter, and the first stage converter comprises a first inductor, a first diode and the first power switch.

17. The system of claim 16, wherein the second stage converter in each of the non-isolated modules comprises a buck circuit having an input terminal connected in series to the output terminal of the first stage converter, and the buck circuit comprises a second inductor, a second power switch and a second diode.

18. The system of claim 17, wherein the second inductor is connected between an anode of the second diode and a negative output terminal of the buck circuit, and the second power switch is connected between a negative input terminal of the buck circuit and the anode of the second diode.

19. The system of claim 17, wherein the first stage converter further comprises a rectifying circuit having an input terminal connected in series to the input terminal of the non-isolated module, wherein the input of the non-isolated modules are AC.

20. The system of claim 10, wherein the plurality of non-isolated modules operate in an interleaving manner.

21. The system of claim 10, wherein the second stage converter in each of the non-isolated modules comprises a buck circuit having an input terminal connected in series to an output terminal of the first stage converter, and the buck circuit comprises a second inductor, a second power switch and a second diode.

22. The system of claim 21, wherein the second inductor is connected between an anode of the second diode and a negative output terminal of the buck circuit, and the second power switch is connected between a negative input terminal of the buck circuit and the anode of the second diode.

23. The system of claim 21, wherein the first stage converter further comprises a rectifying circuit having an input terminal connected in series to the input terminal of the non-isolated module, wherein the input of the non-isolated modules are AC.

24. The system of claim 11, further comprising a reference value computing unit connected to the sampling unit and the comparing unit and configured to calculate the reference value and output the reference value to the comparing unit.

25. The system of claim 24, wherein each of the non-isolated modules comprises the sampling unit, the comparing unit and the controlling unit, and the reference value computing unit is connected to the sampling unit and the comparing unit of each of the non-isolated modules, respectively.

* * * * *